(12) United States Patent
Ragland

(10) Patent No.: US 7,849,943 B1
(45) Date of Patent: Dec. 14, 2010

(54) TOWING DEVICE

(76) Inventor: Norm Ragland, 4317 Elliott Ranch Rd., Elk Grove, CA (US) 95758

( * ) Notice: Subject to any disclaimer, the term of this patent is extended or adjusted under 35 U.S.C. 154(b) by 206 days.

(21) Appl. No.: 12/082,993

(22) Filed: Apr. 17, 2008

(51) Int. Cl.
*B62D 51/02* (2006.01)

(52) U.S. Cl. ...................................... 180/19.2; 180/215

(58) Field of Classification Search ................ 180/19.1, 180/19.2, 19.3, 210, 215
See application file for complete search history.

(56) References Cited

U.S. PATENT DOCUMENTS

| | | | | |
|---|---|---|---|---|
| 3,942,823 A | * | 3/1976 | Shields et al. ............. | 280/423.1 |
| 4,629,020 A | * | 12/1986 | Thurman ................... | 180/19.2 |
| 5,259,471 A | * | 11/1993 | Taylor et al. .................. | 180/12 |
| 6,935,446 B2 | * | 8/2005 | Walker ....................... | 180/6.48 |
| 7,032,694 B2 | * | 4/2006 | Jessen ........................ | 180/19.1 |

* cited by examiner

*Primary Examiner*—Kevin Hurley
(74) *Attorney, Agent, or Firm*—Mark C. Jacobs

(57) ABSTRACT

A towing device for aiding in maneuvering a trailer prior to attachment to or subsequent to detachment from its towing vehicle comprises a frame and other components. A hydrostatic trans-axle is laterally mounted on one end of the frame, a pair of drive wheels is mounted on the hydrostatic trans-axle, a caster wheel is mounted on the other end of the frame and an internal combustion engine is mounted on the frame and coupled to the drive wheels. A main handle is linked to the hydrostatic trans-axle for guiding the towing device. A control handle is mounted on the main handle and coupled to the trans-axle for controlling the direction of movement and speed of movement of the towing device. A neutral bypass lever is provided for disconnecting the internal combustion engine from the drive wheels when so desired and a braking mechanism is provided for braking the towing device.

19 Claims, 7 Drawing Sheets

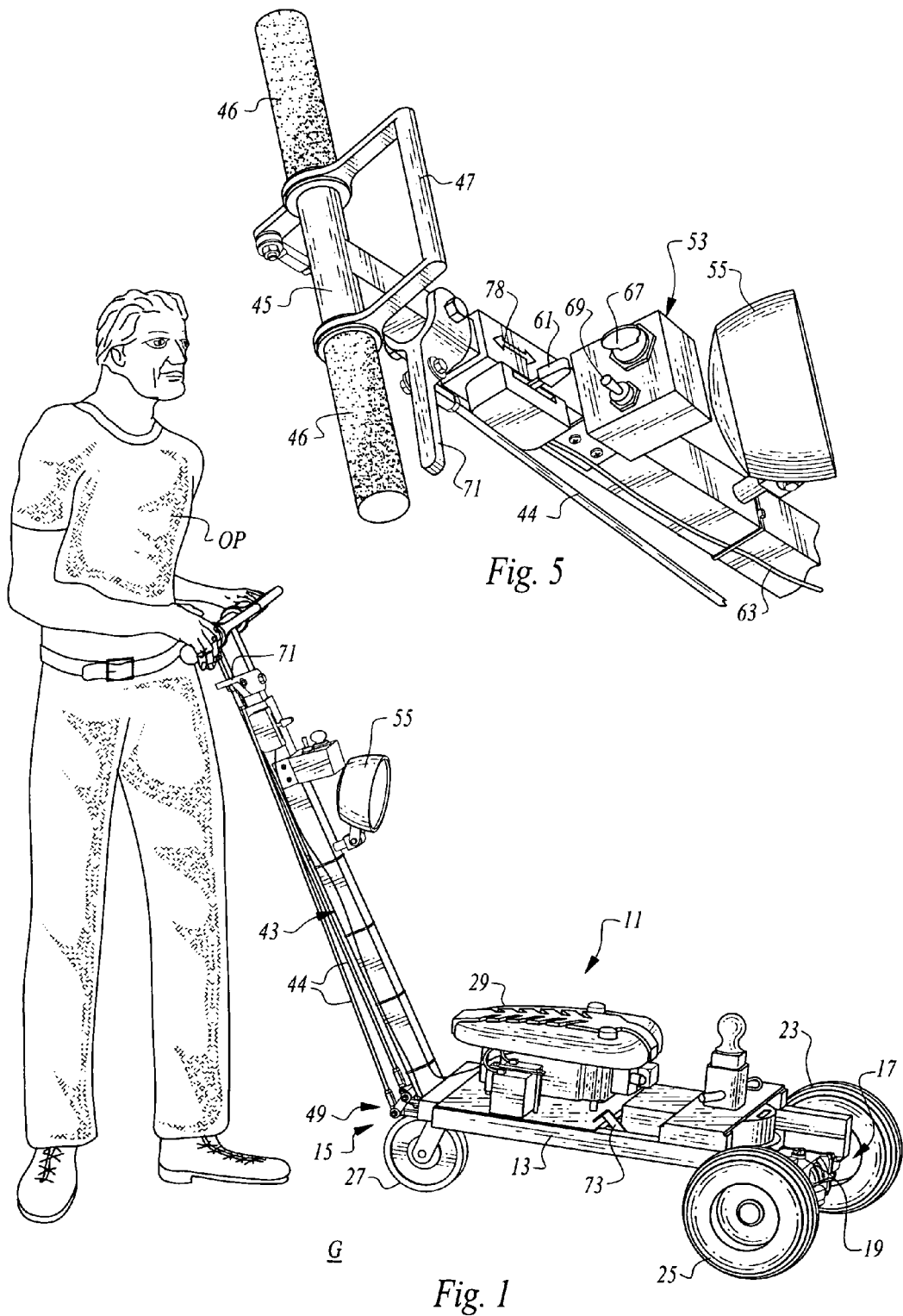

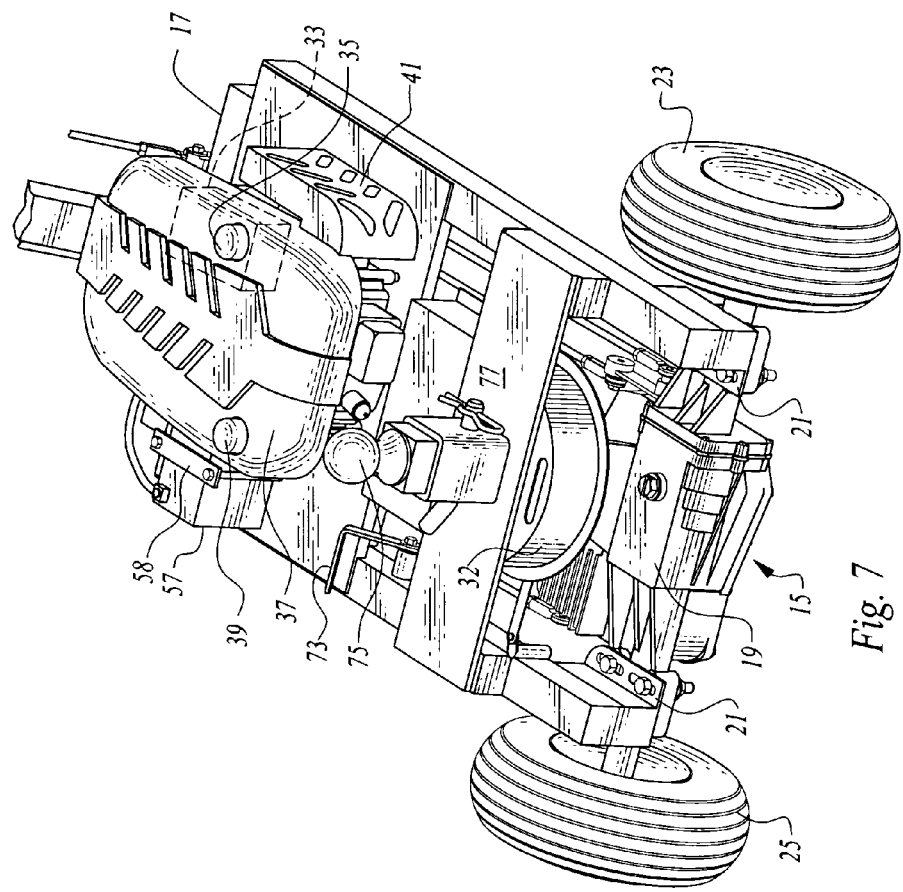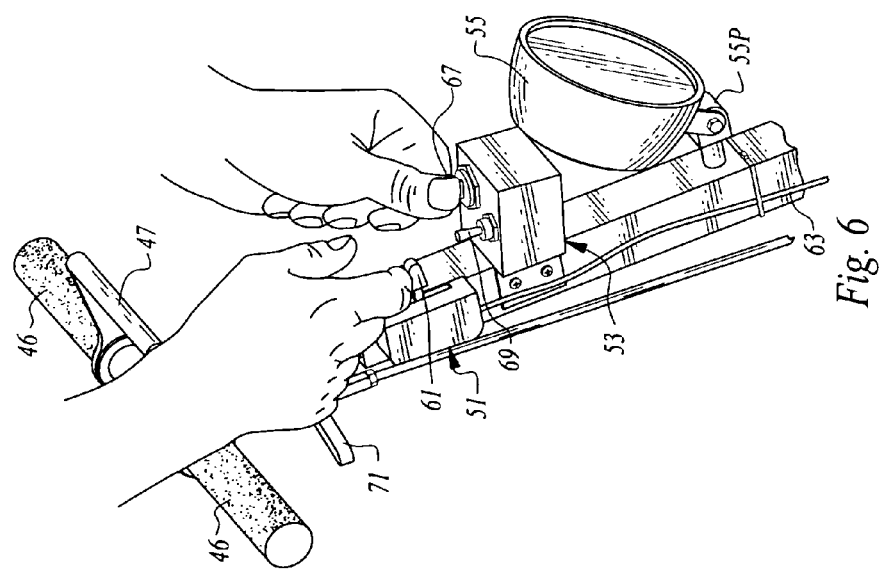

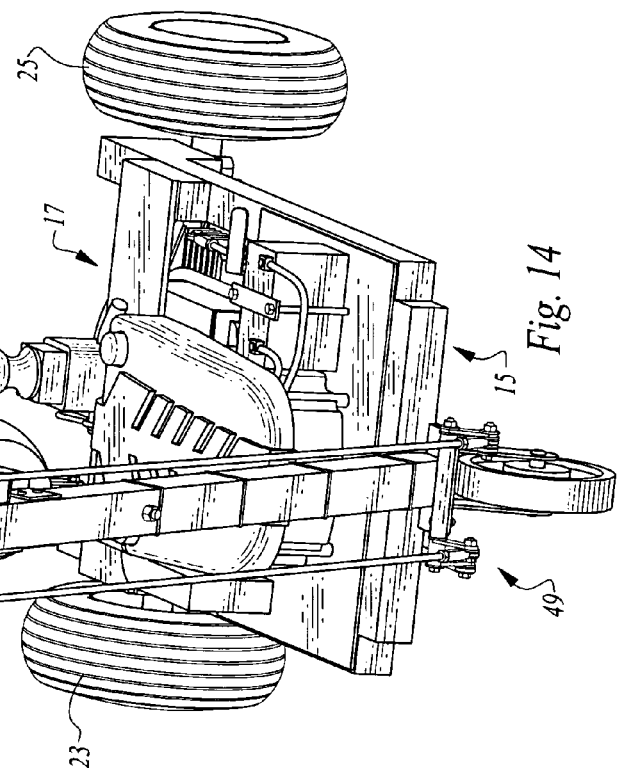
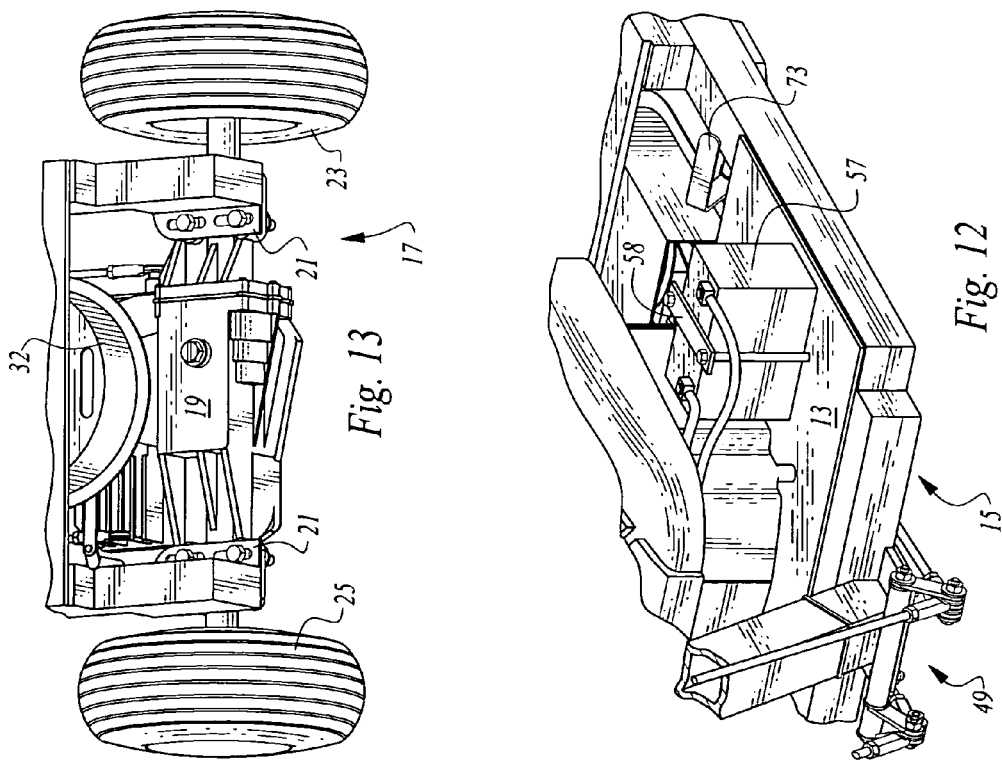

TOWING DEVICE

BACKGROUND OF THE INVENTION

The present invention relates generally to towing devices and, more particularly, to a low speed motorized towing device for aiding in maneuvering a trailer, such as a house trailer or a boat on a trailer, prior to attachment to a towing vehicle or after the trailer has been detached from the towing vehicle.

In the past, a number of different arrangements have been proposed for enabling a trailer to be moved relatively short distances when the trailer is detached from its towing vehicle. Some of these arrangements have included hand powered devices and other arrangements have included motor driven devices. However, none of these prior arrangements have proven to be entirely satisfactory, for one reason or another.

In U.S. Pat. No. 3,770,070 to J. D. Smith, there is disclosed a utility vehicle and vehicle mover that is power propelled, and which may be moved by an individual to both lift and transport extremely heavy vehicles, such as trailers, when the vehicle has been disconnected from its prime mover. In one embodiment, the mover includes an adjustable power lifting means that may extend a distance under the trailer tongue for increased stability. In another embodiment, the mechanism is integral with the trailer tongue itself. In still another embodiment of the invention, the mover includes an internal combustion engine. In a further embodiment of the invention, the mover includes a main frame supported from the ground by drive wheels and follower wheel and guided by steering yoke. A power plant is mounted on the frame and through a transmission system only identified generally, and via a clutch system, the speed of the power plant is reduced to the desired travel speed and the desired travel direction can be controlled.

In U.S. Pat. No. 3,861,482 to W. J. Stephens, et al., there is disclosed a motor-driven wheel which is coupled through a rigid support to the front end of a trailer for moving the latter around when the wheel is in driving engagement with ground. The ground wheel may be raised to an inoperative position off the ground, when desired. The ground wheel may be turned to various angular positions with respect to the trailer.

In U.S. Pat. No. 6,938,711 to M. C. Kime, et al. there is disclosed a freestanding self-propelled device for moving objects. The device includes a chassis having lower frame portions and upright frame portions. A single motor-driven drive wheel is centrally located between the lateral ends of the chassis and coupled to the chassis so as to be pivotable about a substantially vertical axis. The drive wheel is located between sets of support wheels coupled to the lower frame portion of the chassis. In combination, the drive wheel and the support wheels result in the device being able to free stand on the ground. The drive wheel projects below the sets of support wheels so that the device is supported by the drive wheel and by only one of each set of support wheels at any given time, thereby establishing a three-point contact with the surface supporting the device. A tiller equipped with controls is pivotably coupled to the drive wheel for pivoting the drive wheel about its vertical axis.

In U.S. Pat. No. 4,860,841 to A. Sacco, there is disclosed a motorized device for aiding the maneuvering of trailers subsequent to detachment from the towing vehicle which comprises a shaft attachable to the drawbar of the trailer and which is adjustable for height. At least one wheel is mounted at the end of the shaft with the axis of the wheel being perpendicular to the shaft. At least one driving device for driving the wheel in rotation about its axis and a swiveling device for swiveling the wheel are also provided.

In U.S. Pat. No. 7,216,728 to C. Huang, etc., there is disclosed a motorized apparatus for towing a wheelchair which includes a framework having a chassis, a handle assembly, a motor driving assembly and a wheelchair connecting assembly. The handle assembly is adjustably mounted on the chassis. The motor driving assembly is mounted on the chassis and includes a wheel assembly with a single wheel rotatably mounted on the chassis. The motor driving assembly further includes a combined clutch and brake assembly which is connected to the wheel assembly and a motor assembly which is connected to the combined clutch and brake assembly to drive the single wheel assembly through the combined clutch and brake assembly. A hand operated battery assembly is coupled electrically to the motor assembly to drive the control unit and the motor assembly. The wheel chair connecting assembly interconnects the framework to a wheel chair. Consequently, the motorized apparatus will tow the wheelchair along a path, road, and so on.

In Canadian Patent Application 2,447,019 a new motorized tow-motor module with electronic control and a quick-release attachment mechanism is described to provide on demand motive power to a range of detachable containers or trolleys allowing heavy loads to be carried and moved between locations easily. The tow-motor includes a pair of load bearing wheels each attached to an axle supported inside a tubular monocock chassis. In one embodiment of the invention the tubular monocock chassis contains a pair of electronically controlled, variable speed, reversible, direct current motors connected to the axle(s) via a gear train and clutch assembly a rechargeable battery module and an electronic module for controlling the power applied to each of the electric motors in response to displacement and steering commands applied by the operator to a remote handle mounted controller.

It is an object of this invention to provide a towing device for aiding a person in maneuvering a trailer, such as a house trailer or a boat on a trailer, when the trailer has been detached from its towing vehicle.

It is another object of this invention to provide a towing device as described above which is motorized.

It is still another object of this invention to provide a towing device as described above which is low speed.

It is yet still another object of this invention to provide a towing device as described above which is adjustable in speed.

It is a further object of this invention to provide a towing device as described above which is free standing.

It is yet another object of this invention to provide a towing device as described above which can move trailers or other wheeled objects which weigh as much as 17,000 pounds on a level surface.

It is yet still another object of this invention to provide a towing device as described above which can move wheeled objects.

It is a further object of this invention to provide a towing device which is free standing and which can move in both a forward direction and a rear direction.

It is still a further object of this invention to provide a towing device as described above, which is easily maneuverable.

SUMMARY OF THE INVENTION

According to this invention, there is provided a low speed motorized towing device for aiding in maneuvering a trailer prior to attachment or subsequent to detachment of the trailer from its towing vehicle. The low speed motorized towing device comprises a frame having a front end and a rear end. A hydrostatic trans-axle is mounted on the rear end of the frame and a pair of drive wheels is mounted on the hydrostatic trans-axle, one on each end thereof and a single caster wheel is mounted on the front end of the frame. The pair of drive wheels and the caster wheel together support the frame on a surface. An internal combustion engine for driving the drive wheels is mounted on the frame and is coupled to the hydrostatic trans-axle. A main handle is also mounted on the frame for maneuvering the towing device, while a control handle is mounted on the main handle and is coupled to the hydro-static trans-axle for controlling both the direction of movement of the low speed motorized towing device and the speed at which the low speed motorized towing device moves. A hitch ball mounted on the frame is used for attaching the low speed motorized towing device to a hitch on the trailer. A neutral by pass-lever is coupled to the hydrostatic trans-axle for selectively disconnecting the internal combustion engine from the drive wheels. The device also possesses an ignition assembly for activating the internal combustion engine, a throttle for regulating the speed of the internal combustion engine, and a brake handle mounted on the main handle and coupled to the hydrostatic trans-axle for slowing down the towing device.

Various other features and advantages will appear from the description to follow. In the description, reference is made to the accompanying drawings which form a part thereof, and in which is shown by way of illustration, an embodiment for practicing this invention. This embodiment will be described in sufficient detail to enable those skilled in the art to practice the invention. It is to be understood that other embodiments may be utilized and that structural changes may be made without departing from the scope of the invention. The following detailed description is therefore, is not to be taken in a limiting sense, and the scope of the present invention is best defined by the appended claims.

It should also be noted that the invention can also be used in other instances such as in a parking lot or driveway to move the trailer a short distance, to park cars or for some other reason.

BRIEF DESCRIPTION OF THE DRAWINGS

In the drawings wherein like characters represent like parts:

FIG. 1 is a perspective view of an embodiment of a towing device constructed according to this invention. Also shown in FIG. 1 is an operator holding on to the main handle of the towing device;

FIG. 5 is a fragmentary perspective view of the main handle of the towing device shown in FIG. 1;

FIG. 6 is a fragmentary perspective view of the main handle of the towing device shown in FIG. 1 and an operator turning on the ignition on the main handle;

FIG. 7 is a fragmentary perspective view of the rear end of the towing device shown in FIG. 1;

FIG. 12 is a closeup perspective view taken from the top of the towing device shown in FIG. 1;

FIG. 13 is a partial perspective view of the rear end of the towing device shown in FIG. 1;

FIG. 14 is a perspective view taken from the front of the towing device shown in FIG. 1.

DETAILED DESCRIPTION OF THE PREFERRED EMBODIMENT

Figures 2, 3:
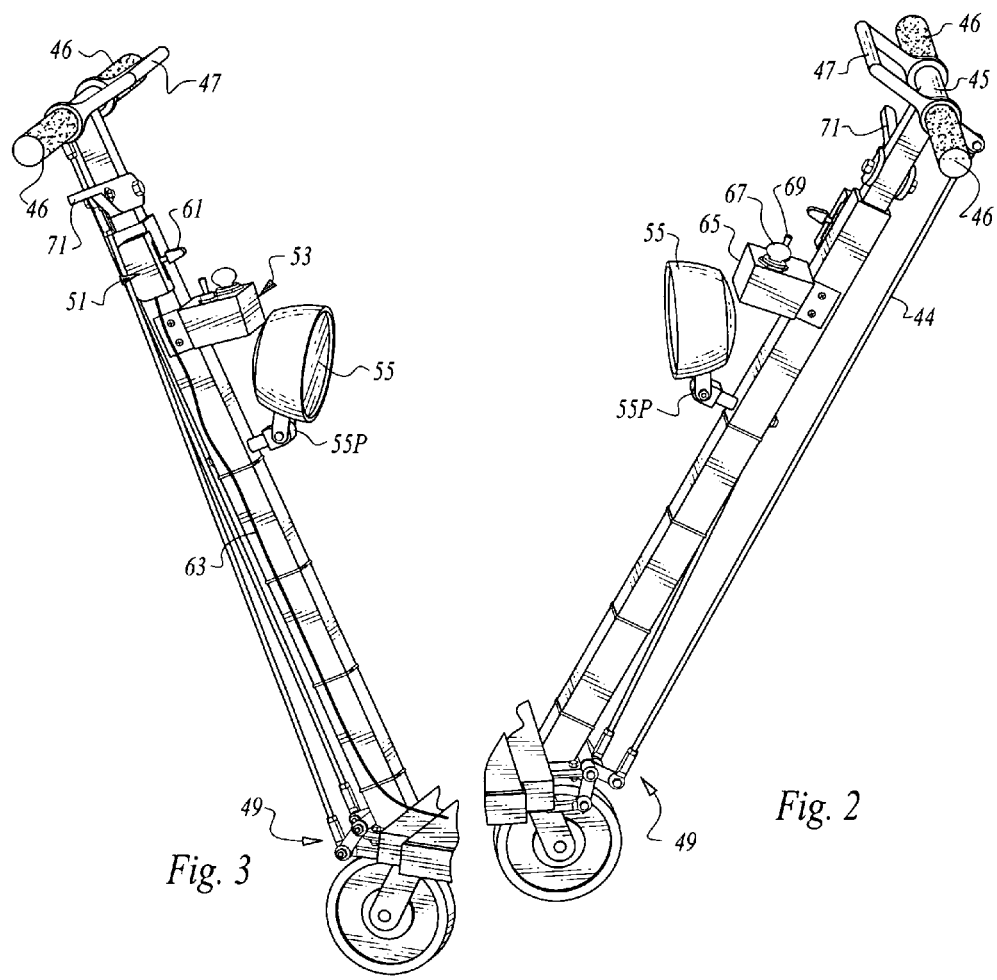
FIG. 2 is a fragmentary perspective view taken from the right of the front portion of the towing device shown in FIG. 1.
FIG. 3 is a fragmentary perspective view taken from the left of the front portion of the towing device shown in FIG. 1.

Referring now to the drawings, and first to FIG. 1, there is shown an embodiment of a towing device according to this invention for use in maneuvering a trailer prior to attachment to or subsequent to detachment of the trailer from its towing vehicle, the towing device being of low speed and motorized and being identified by reference numeral 11. Also shown in FIG. 1 is an operator OP for controlling the movement of towing device 11 for short distances of up to about 1 mile.

Towing device 11 includes an elongated "H" shaped, preferably steel, tubular frame 13 having a front end 15 and a rear end 17. A combination transmission and axle, which is known as a "trans-axle", (see FIG. 7) and designated 19 is fixedly mounted on the rear end 17 of frame 13 through a pair of brackets 21 attached to the frame 13. Trans-axle 19 is hydrostatic in that it has a differential and as such is variable in control. In other words, its output speed can be varied infinitely from zero speed to the maximum speed of the engine to which it is coupled. Trans-axle 19 may be, for example, a Hydro-Gear 329-3000 trans-axle. The speed range of towing device 11 varies from a few feet per second to a few miles per hour due to the hydrostatic trans-axle 19.

A pair of drive wheels 23 and 25 having pneumatic tires thereon are rotatably mounted on trans-axle 19, one on each end thereof. A pivoting heavy duty caster wheel 27 having a pneumatic tire is pivotally mounted on the front end 15 of frame 11. By "heavy duty" is meant a caster suitable for use on a forklift, about a 900 plus pound caster and which is attached by collar locks, not by cotter pins. Frame 11 is supported from the ground G by drive wheels 23 and 25 and caster wheel 27.

Figure 11:
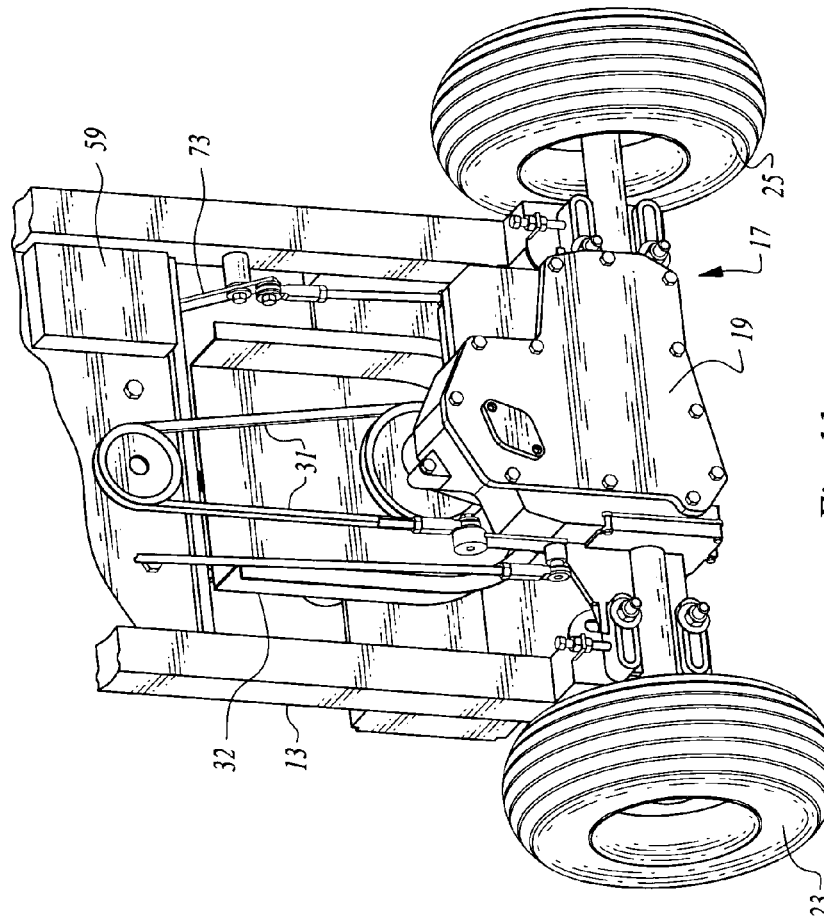
FIG. 11 is a partial perspective view of bottom of the towing device shown in FIG. 1.
Figure 10:
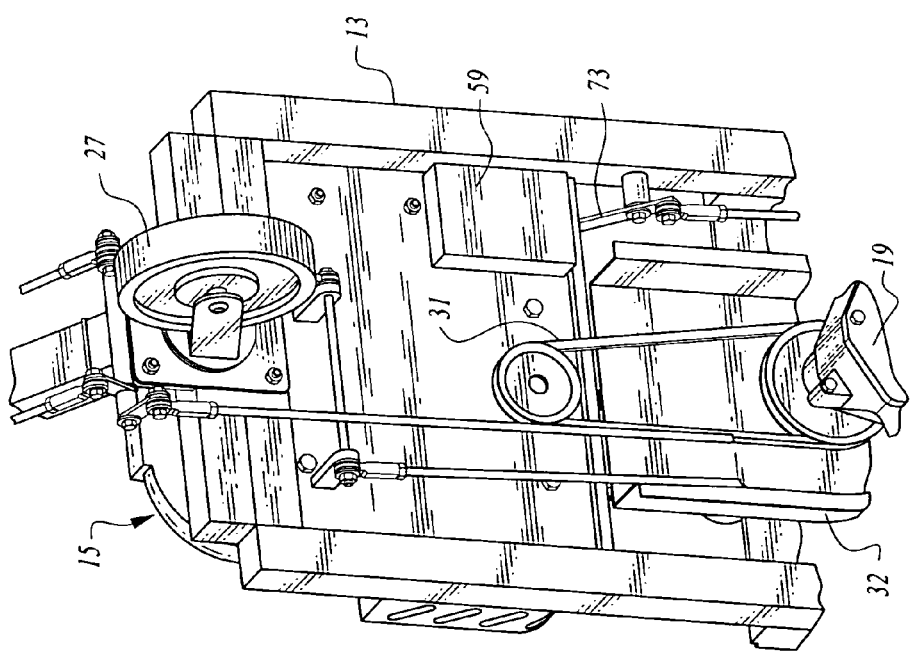
FIG. 10 is a fragmentary perspective view taken from the bottom front of the towing device shown in FIG. 1.
Figure 15:
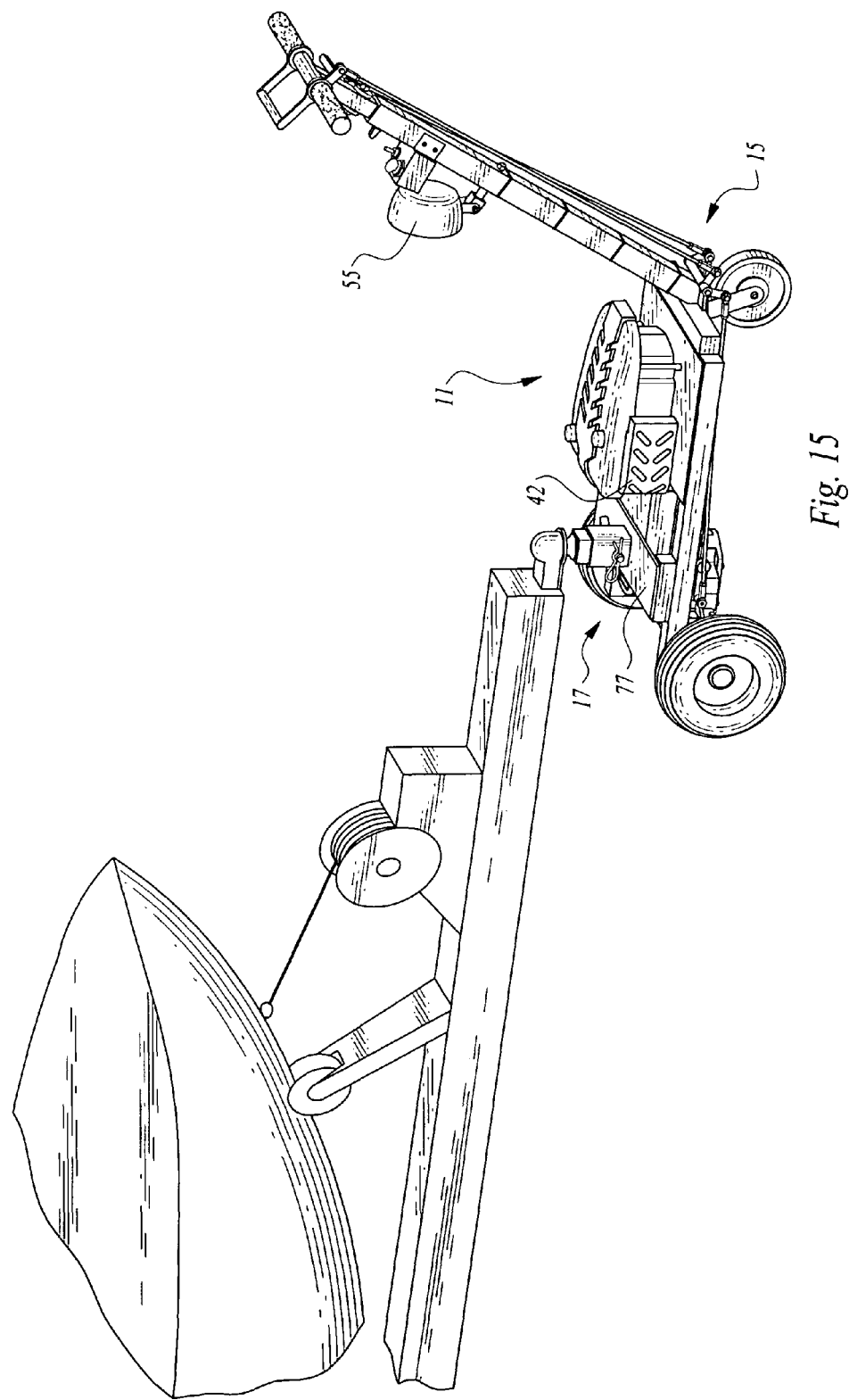
FIG. 15 is a perspective view showing the towing device in FIG. 1 attached to a boat trailer having a boat mounted thereon.

Towing device 11 further includes a four cycle, six and a half horsepower Briggs and Stratton® hydrostatic internal combustion engine 29 for driving drive wheels 23 and 25. Any other brand of engine from 4.0 to 8.0 HP may also be employed. Engine 29 is fixedly mounted in a conventional manner on frame 13. Thru trans-axle 21, the speed of towing device 11 can be adjusted to the desired travel speed as well as to the travel direction (i.e. forwardly or rearwardly). Engine 29 is connected to trans-axle 19 through a pulley 31 (see FIG. 11). As seen in FIG. 11, engine 29 includes a fan (not shown) which is covered by a fan guard 32 (also seen in FIG. 11). The fan cools the trans-axle 19 which heats up during use. The same pulley 31 which operates the cooling fan drives the trans-axle 19. A gas tank 33 for holding a supply of gasoline is fixedly mounted on top of engine 29 and includes a removable gas cap 35 which enables filling gas tank 33 with gasoline. Engine 29 also includes a cover 37 having a removable oil-fill cap 39 for filling and checking the oil in engine 29 (see FIG. 7). Engine 29 further includes a muffler 41 (also seen in FIG. 7) for muffling the noise on engine 29 and a guard plate 42. In the Figures, guard plate 42 is only shown in FIG. 15 and is intended to keep the user's fingers away from engine 29.

A main handle 43 is provided for enabling operator OP to maneuver the towing device 11. Main handle 43 includes an elongated rod 44. A handle bar 45 is rotatably attached to the top of elongated rod 44 and is normal thereto. A pair of spaced handle bar grips 46 are fixedly mounted on handle bar 45, one on each end thereof. Handle bar 45 is coupled to trans-axle 19 by a linkage 49. When handle bar 45 is rotated, braking is applied to towing device 11, similar to the way hand brakes function on a bicycle (see also FIG. 5).

A U shaped control handle 47 (see FIG. 3) is provided for controlling the speed at which towing device 11 moves and the direction in which towing device 11 moves (i.e. forwardly or rearwardly). Handle 47 is rotatably mounted on handle bar 45 between the handle bar grips 46 and is coupled through a cable 48 to trans-axle 19 (see FIG. 2). When control handle 47 is rotated in a counter clockwise direction (as shown by arrow A in FIG. 2), trans-axle 19 will move towing device 11 in a rearward direction (as shown by arrow B in FIG. 2). The speed at which towing device 11 moves will vary directly according to the extent to which control handle 16 is rotated. On the other hand, when control handle 47 is rotated in a clockwise direction (as shown by arrow C in FIG. 2), trans-axle 19 will move towing device 11 in a forward direction (as shown by arrow D in FIG. 2), again, the speed varying directly according to the extent to which control handle 47 is rotated. Note the direction indicator decal 78 in FIG. 5.

Control handle 47 is spring loaded so that if it is not rotated in either direction it will return to (or stay in) an "at rest" position (as shown in FIG. 2), in which case trans-axle 19 will not rotate. As such, control handle 45 will function as a "dead man" switch and stop movement of towing device 11; i.e. acting as a brake.

The towing device 11 (as seen in FIG. 3) further includes a throttle assembly 51 for controlling the speed of engine 29, an ignition system 53 for starting engine 29, a headlamp 55 and a battery 57 for providing power for ignition system 53, and the headlamp 55. The headlamp 55 which is mounted so that it can pivot by a bracket 55P is electrically connected to an on-off switch 69.

Throttle assembly 51 includes a throttle control 61, a throttle base 62 and a cable 63. Throttle base 62 is fixedly mounted onto main handle 43. Throttle control 61 is pivotally mounted onto throttle base 61 and is coupled to engine 29 through cable 63 (as seen in FIG. 3).

Figure 4:
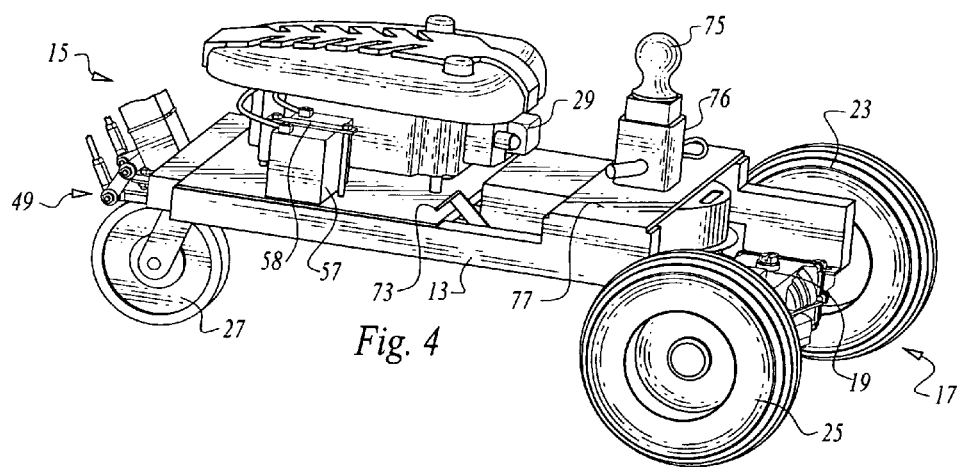
FIG. 4 is a fragmentary perspective view taken from the left side of the bottom area of the towing device shown in FIG. 1.
Figure 9:
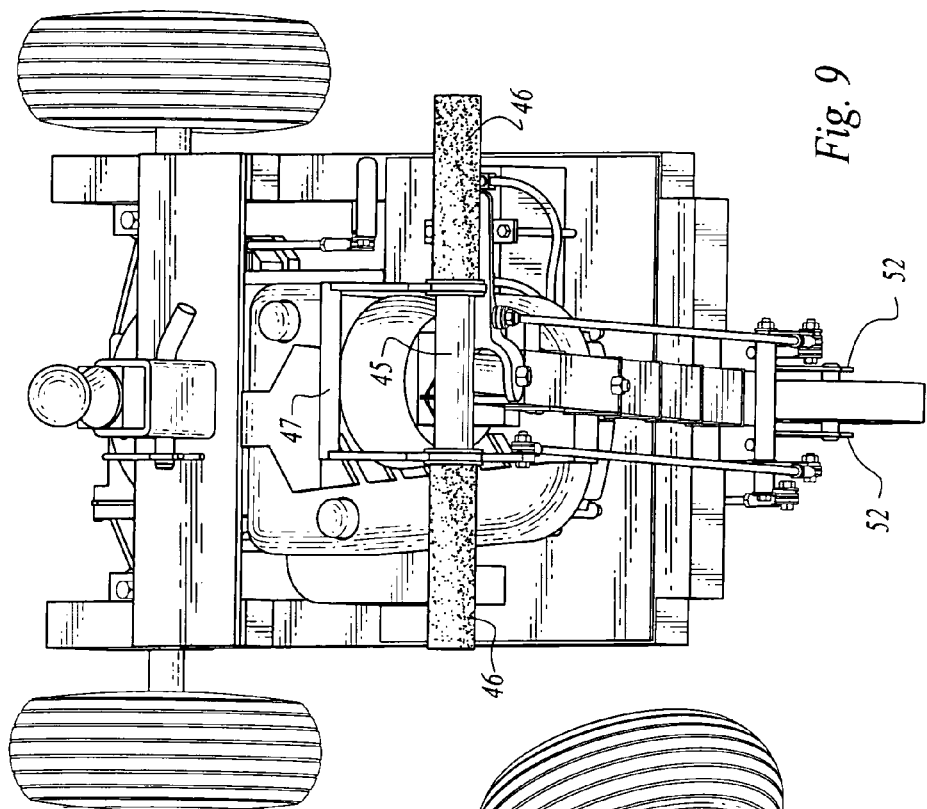
FIG. 9 is a top front perspective view of the towing device shown in FIG. 1.
Figure 8:
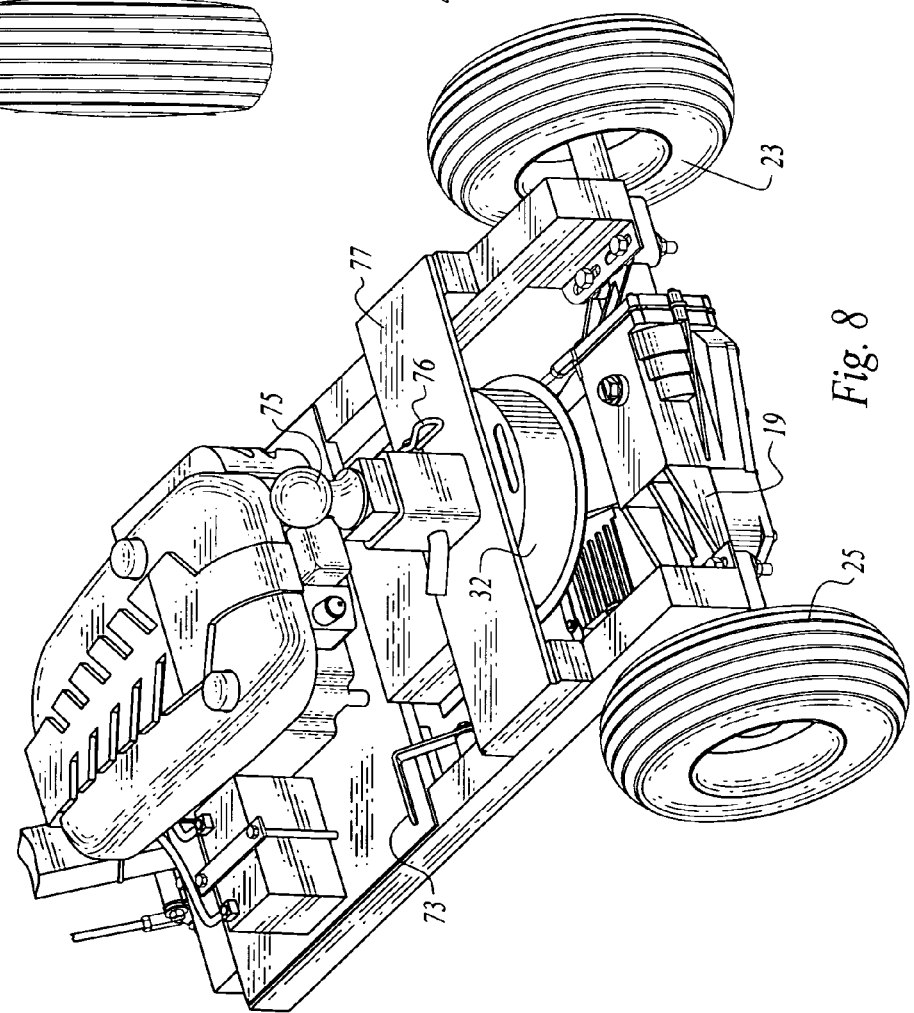
FIG. 8 is another fragmentary perspective view of the rear end of the towing device shown in FIG. 1.

Ignition system 53 includes a box shaped housing 65, an electrical starter mechanism (i.e. ignition) located inside box shaped housing 65, a key operated ignition switch 67 (see FIG. 2) located on housing 65 for turning on the electrical starter mechanism and a light switch 69 for turning on headlamp 57. Starter mechanism and headlamp 55 are both powered by battery 57. Battery 57 (seen in FIGS. 4 and 12) held on frame 13 by a retainer 58 can be recharged by battery charger 59 which is mounted on the bottom side of frame 13 and which is connectable to an A.C. socket, (see also FIG. 8) by a conventional cord. A conventional primer that acts like a choke for the carburetor is also provided.

Towing device 11 further includes a brake lever 71 which is pivotally mounted on rod 44 and coupled by a linkage 52 to trans-axle 19. When brake lever 71 is pulled upward toward handle bar 45, braking is applied to trans-axle 19 (see FIG. 5).

Towing device 11 further includes a neutral by-pass lever 73 for bypassing the relief pressure internally in trans-axle 19 so that drive wheels 23 and 25 can turn freely when engine 29 is off and the operator wants to move towing device 11 around, such as in a garage. Neutral by-pass lever 73 is pivotally mounted on frame 13 and coupled to trans-axle 19 by a linkage. When neutral by-pass lever 73 is in a rearward position, such as (shown in FIG. 4), drive wheels 23 and 25 are connected through trans-axle 29 to engine 29 and will not freely move. On the other hand, when neutral by-pass lever 73 is pushed upward to a forward position, drive wheels 23 and 25 are not connected through trans-axle 19 to engine 29 and drive wheels 23 and 25 can move freely. This is similar to when an automobile is in "park" or "neutral". In essence, if a small amount of movement, as in a garage, is desired, and the engine 29 is off, the neutral by pass lever 73 is pushed to a forward position, by-passing the relief pressure internally in the transmission to allow the drive wheels 23 to move freely.

Towing device 11 also includes a hitch ball 75 for attaching towing device 11 to the hitch on a trailer. Hitch ball 75 is removably mounted on a hitch ball receptacle 76 which is fixedly mounted on a plate 77 attached to frame 13. Since it is removably mounted on hitch ball 75 it can be removed and replaced with different sized hitch balls, as may be needed. Not seen in the Figures on the underside of the frame near the back wheels is a pair of bolts that hold a pair of ballasts on the frame. Each ballast serves to counteract the torque generated by the trans-axle.

A perspective view showing towing device 11 attached to a boat trailer having a boat mounted thereon can be seen in FIG. 17. The boat trailer can be moved at speeds ranging from one inch per minute up to walking speed, about 4 miles per hour.

It should be understood that the invention need not be limited to towing devices for trailers. Instead, other attachment structures could be implemented for attaching towing device 11 to other wheeled objects requiring towing, such as car carriers or wheel chairs and so forth.

The embodiment of the present invention described above is intended to be merely exemplary and those skilled in the art shall be able to make numerous variations and modifications to it without departing from the spirit of the present invention. All such variations and modifications are intended to be within the scope of the present invention as defined in the appended claims.

For example, the 6 HP engine can be any engine having between 4.0 and 8.0 HP. The larger the engine, the less time it will take to move a fixed distance.

I claim:

1. A towing device for use in maneuvering a trailer when the trailer is detached from its towing vehicle or the trailer having a hitch, the towing device comprising:
    (a) a frame having a front end and a rear end,
    (b) a hydrostatic trans-axle mounted on the rear end of the frame,
    (c) a pair of drive wheels mounted on the hydrostatic trans-axle, one on each end, for driving the towing device, said pair of drive wheels and the wheel mounted on the front end of the towing device together supporting the frame on a surface,
    (d) a wheel mounted on the front end of the frame,
    (e) an internal combustion engine connected to the trans-axle for driving the drive wheels, said internal combustion engine being mounted on the frame,
    (f) a main handle mounted on the frame and linked to the trans-axle for enabling an operator to guide the towing device, the main handle having a handle bar attached to it,
    (g) a control handle mounted on the main handle and coupled to the hydrostatic trans-axle for controlling the direction of movement of the towing device and the speed of movement of the towing device, (h) a hitch ball on the frame for use in attaching the towing device to the hitch on the trailer,
(l) an ignition system mounted on said device for activating the internal combustion engine, and
(j) a throttle connected to said engine for regulating the speed of the internal combustion engine.

2. The towing device of claim 1 wherein the main handle comprises an elongated rod mounted at one end to the frame and linked to the trans-axle and a pair of handle bars at the other end of the elongated rod.

3. The towing device of claim 2 wherein the control handle is mounted on main handle between the handle bars and is spring loaded to the neutral position and thus can act as a deadman brake.

4. The towing device of claim 3 wherein the ignition mechanism includes a key operated switch.

5. The towing device of claim 4 wherein the throttle includes a lever movably mounted on the elongated rod of the main handle.

6. The towing device of claim 5 wherein the hitch ball is removably mounted a ball receptacle which is mounted on the frame.

7. The towing device of claim 6 and further including a neutral by-pass lever coupled to the trans-axle for disconnecting the internal combustion engine from the drive wheels when so desired.

8. The towing device of claim 7 wherein the neutral by-pass lever is pivotally mounted on the frame.

9. The towing device of claim 8 wherein the ignition system includes a starter mechanism.

10. The towing device of claim 9 wherein the control handle is rotatably mounted on the main handle.

11. A towing device for slowly maneuvering a wheeled object comprising:
(a) a frame,
(b) a hydrostatic trans-axle mounted on the frame,
(c) a pair of drive wheels mounted on the hydrostatic trans-axle,
(d) a third wheel mounted on the frame, said third wheel being a heavy duty caster wheel spaced forwardly of said drive wheels, wherein the pair of drive wheels and the third wheel collectively support the frame on a surface,
(e) an internal combustion engine connected to the trans-axle for driving the drive wheels and which is mounted on the frame,
(f) a main handle for enabling a person to guide the towing device linked to the trans-axle,
(g) a control handle coupled to the trans-axle for controlling the direction of movement of the towing device and the speed at which the towing device moves, and
(h) hitch ball means on the frame for attaching the towing device to the wheeled object.

12. The towing device of claim 11 and further including hand brakes mounted on said main handle and connected to the wheel assembly for braking the towing device.

13. The towing device of claim 12 wherein the third wheel is a heavy duty caster wheel and the drive wheels are retained by collar locks.

14. The towing device of claim 13 wherein the internal combustion engine is mounted on the frame, ranges between 4.0 and 8.0 HP.

15. The towing device of claim 14 and further including a neutral by-pass lever coupled to the trans-axle for selectively disengaging the internal combustion engine from the drive wheels.

16. The towing device of claim 15 further including hand brakes for braking the towing device.

17. The towing device of claim 16 and further including an ignition system mounted on said handle and coupled to said engine for starting the internal combustion engine.

18. The towing device of claim 17 wherein the hitch ball is removably mounted onto the frame and the wheels include pneumatic tires.

19. A towing device for maneuvering a wheeled object comprising:
(a) a tubular frame,
(b) a hydrostatic trans-axle mounted to the frame,
(c) a pair of drive Wheels mounted on the trans-axle,
(d) a third wheel mounted, on the frame, spaced forward from the drive wheels,
(e) the pair of drive wheels and the third wheel collectively supporting the frame on a surface,
(f) an internal combustion engine for driving the drive wheels is coupled to the trans-axle,
(g) means for controlling the direction of movement of the towing device and for controlling the speed at which the towing device moves, and
(h) hitch ball means on the frame for attaching the towing device to the wheeled object.

* * * * *